United States Patent
Archer et al.

[15] 3,668,508
[45] June 6, 1972

[54] REGULATOR CIRCUIT

[72] Inventors: William A. Archer; Ronald H. Randall, both of Cuba; Richard M. Lewis, Black Creek, all of N.Y.

[73] Assignee: Acme Electric Corporation, Cuba, N.Y.

[22] Filed: Sept. 15, 1970

[21] Appl. No.: 72,401

[52] U.S. Cl. .................................... 321/18, 321/18, 321/47
[51] Int. Cl. ........................................................ H02m 7/12
[58] Field of Search ........................ 321/2, 16, 18, 47; 320/1

[56] References Cited

UNITED STATES PATENTS

| | | | |
|---|---|---|---|
| 2,472,838 | 6/1949 | Klemperer | 320/1 |
| 3,454,862 | 7/1969 | Kurimura et al. | 321/18 |
| 3,466,527 | 9/1969 | Chun | 321/18 X |
| 3,417,311 | 12/1968 | Logan | 321/2 |
| 3,439,251 | 4/1969 | Schaefer | 321/18 X |
| 3,324,378 | 6/1967 | Kupferberg et al. | 321/18 |
| 2,888,622 | 5/1959 | Mooers | 321/47 X |
| 3,281,073 | 10/1966 | Chou et al. | 321/47 X |

FOREIGN PATENTS OR APPLICATIONS

| | | | |
|---|---|---|---|
| 958,406 | 2/1957 | Germany | 321/2 |
| 1,315,593 | 12/1962 | France | 321/18 |

OTHER PUBLICATIONS

IBM Technical Disclosure Bulletin, " Rectifier Using Low Saturation Voltage Transistors," J. B. Gunn, Vol. 13, No. 5, Oct. 1970, page 1393.

*Primary Examiner*—William M. Shoop, Jr.
*Attorney*—Woodling, Krost, Granger and Rust

[57] ABSTRACT

A regulator circuit is disclosed incorporating a DC capacitor as an energy storage device to be charged to a direct voltage level from an AC source through switch means. The switch means may be semi-conductor switches and because of the direct voltage on the energy storage device, a substantially square wave alternating voltage appears on the switch input. An inductive reactance absorbs the instantaneous voltage differences between the square wave and the alternating voltage input. The switches are operated at the same frequency as the alternating voltage input and operate at a variable phase angle of lag of the leading edge relative to the alternating voltage input in order to regulate the voltage output which may either DC across the storage device or AC across the switch input. The switch means is a double throw switch conducting for substantially 180° alternately to obtain the direct voltage across the storage device. The foregoing abstract is merely a resume of one general application, is not a complete discussion of all principles of operation or applications, and is not to be construed as a limitation on the scope of the claimed subject matter.

44 Claims, 23 Drawing Figures

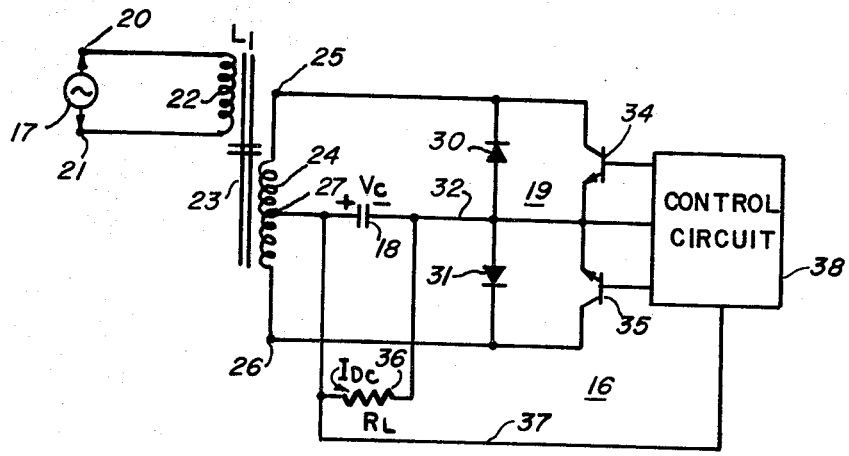
FIG. 1
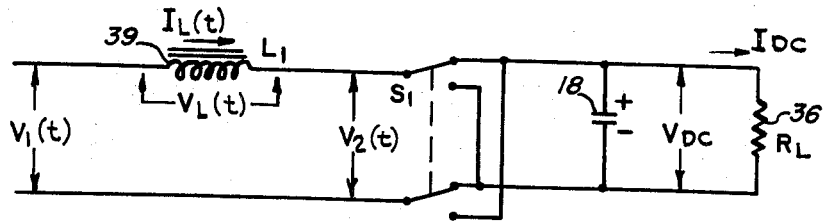
FIG. 2
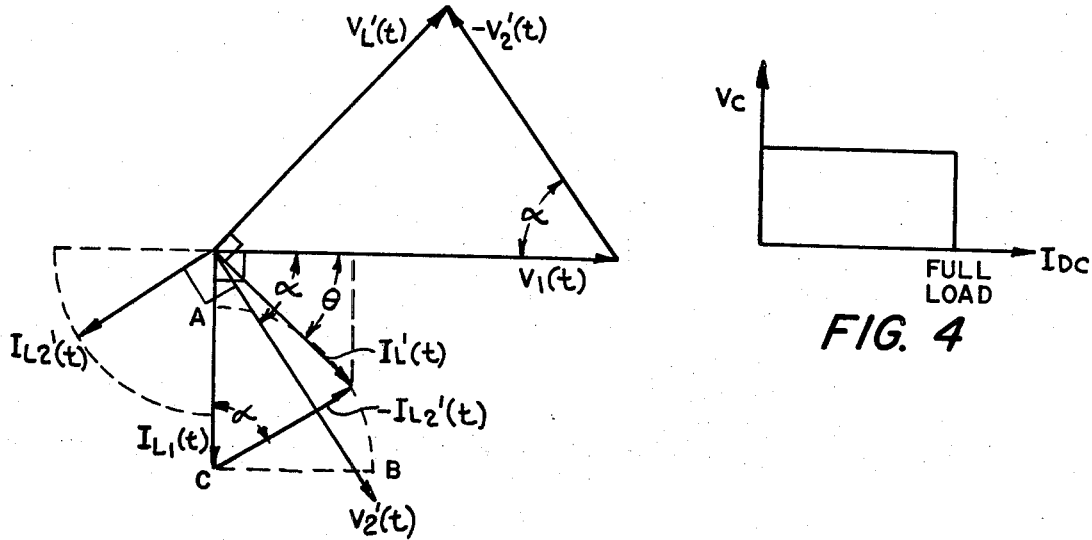
FIG. 3
FIG. 4
INVENTORS
RONALD H. RANDALL
RICHARD M. LEWIS
WILLIAM A. ARCHER
BY Woodling, Krost
Granger and Rust
ATTORNEYS INVENTORS
RONALD H. RANDALL
RICHARD M. LEWIS
WILLIAM A. ARCHER
BY Woodling, Krost
Granzel and Rust
ATTORNEYS INVENTORS
RONALD H. RANDALL
RICHARD M. LEWIS
WILLIAM A. ARCHER
BY Wordling, Krost,
Granger and Rust
ATTORNEYS INVENTORS
RONALD H. RANDALL
RICHARD M. LEWIS
WILLIAM A. ARCHER
BY Woodling, Krost,
Granger and Rust
ATTORNEYS

REGULATOR CIRCUIT

BACKGROUND OF THE INVENTION

Many different regulator systems have been proposed and used and one common system is an AC voltage rectified by a full wave rectifier to supply a DC load. The magnitude of the average voltage across the load may be varied by a variable delay of the leading edge of the current conducted by the rectifiers. This variable delay may be by phase shift control or by DC bias-AC rider control. In either case the trailing edge of the half cycle pulses of current is substantially at the crossover point where the anode voltage for that particular rectifier goes negative.

The disadvantages of this first type of control system is that with a variable leading edge and fixed trailing edge to the current pulses, the harmonic content of the output wave is high and considerable filtering is required to eliminate ripple. In those circuits which have semi-conductor devices operating with variable impedance values, there is a considerable loss of power thrown away as heat developed in the semi-conductor devices.

A second form of regulator system in common use is a constant voltage transformer regulator. These are static devices and sometimes referred to as ferro-resonant transformers of the leakage reactance type. The transformer has a magnetic core with primary and secondary windings and with a shunt plus an air gap between these windings. Such leakage reactance transformers are fairly efficient but have a limited range of about plus or minus 10 percent or possibly as much as plus or minus 15 percent of rated voltage in which constant output voltage may be maintained. The disadvantages are poor regulation with frequency and a highly distorted output wave form which is about 20 percent distortion. Also there are considerable stray magnetic fields around the unit which seriously affect the environment in which it may be used. Additionally such units are sensitive in that the output level does change with power factor changes. Additionally in such constant voltage transformer regulators, a capacitor winding is required with an AC capacitor which is large in volume relative to the size of the magnetic core and is large in volume in comparison to the same microfarad capacity for DC capacitors. Additionally, such constant voltage transformer regulators operate at or near saturation requiring use of special laminations and grades of steel to keep core losses at a reasonable value.

Accordingly, an object of the invention is to provide a regulator circuit obviating the above-mentioned disadvantages.

Another object of the invention is to provide a regulator circuit operable from AC to DC, from DC to DC, from AC to AC and from DC to AC.

Another object of the invention is to provide a regulator circuit wherein an energy storage device stores energy in direct voltage form and forces a switch input to the storage device to have a square wave alternating voltage thereon which may be controlled in phase angle relative to the AC input voltage in order to vary the magnitude of the output voltage.

Another object of the invention is to provide a regulator circuit which may be used for power factor correction of a load.

Another object of the invention is to provide a regulator circuit having a wide range of adjustment of output voltage or current.

Another object of the invention is to provide a regulator circuit requiring no AC capacitors.

Another object of the invention is to provide a regulator circuit which is automatically self-regulating in accordance with the feedback from the load to maintain constant output voltage by phase angle of semi-conductor switches.

SUMMARY OF THE INVENTION

The invention may be incorporated in a regulator circuit operable from an AC input, comprising, in combination, capacitive reactance means, switch means, means to charge said capacitive reactance means of one polarity from the AC input through said switch means periodically actuated at a frequency proportional to the frequency of the AC input, and means to maintain conduction of said switch means throughout substantially 180° of each half cycle of the AC input.

Other objects and a fuller understanding of the invention may be had by referring to the following description and claims, taken in conjunction with the accompanying drawing.

BRIEF DESCRIPTION OF THE DRAWING

FIG. 1 is a simplified schematic drawing of one embodiment of the invention;

FIG. 2 is a schematic diagram of a simplified version of the invention;

FIG. 3 is a vector diagram of voltages and current in the circuit;

FIG. 4 is a graph of voltage versus current;

DESCRIPTION OF THE INVENTION

Figure 5A:
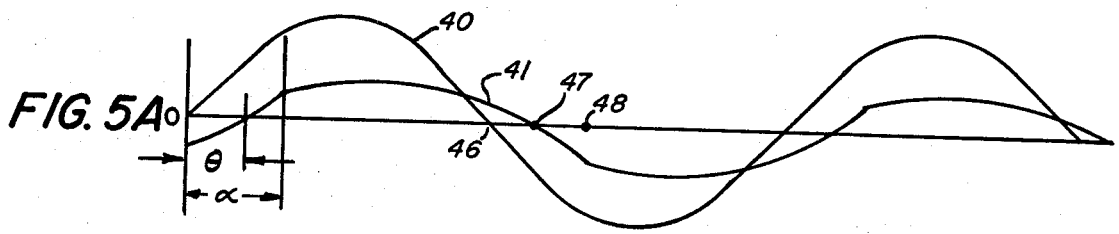
FIG. 5 is a graph of voltage and current in the circuit.

FIG. 1 of the drawing shows one simplified embodiment of the invention in a regulator circuit 16 which is operable from an alternating voltage source 17 supplying rectified energy to an energy storage device 18 by the way of switch means 19 shown as including rectifiers. In this embodiment the alternating voltage source 17 is applied to input terminals 20 and 21 to which is connected a primary winding 22 of a leakage reactance transformer 23. This transformer has a secondary winding 24 having end terminals 25 and 26 and a midtap 27.

The switch means 19 includes diodes 30 and 31 connected between the secondary winding end terminals 25 and 26, respectively and a center conductor 32. The energy storage device 18, shown in this embodiment as a capacitor is connected between the midtap 27 and this center conductor 32. The switch means 19 further includes an inverse parallel connection of controllable uni-directionally conductive devices, in this case shown as transistors 34 and 35, respectively. An output voltage is obtained in accordance with the DC voltage across the capacitor 18 or in accordance with the alternating voltage across the secondary winding end terminals 25 and 26, and in this case is taken as a DC output voltage across the capacitor 18. An output load resistor 36 is connected across the capacitor 18 and a feedback of the output voltage is taken via the center conductor 32 and a feedback conductor 37 to a control circuit 38. This control circuit 38 is connected to the bases of the transistors 34 and 35 to control the conductivity thereof.

The energy storage device 18 is shown as a capacitor and in many of the circuits it is shown as connected in parallel with the load 36. If a battery charging circuit is the end use of the regulator circuit, then the energy storage device may be simply the storage battery and may eliminate the capacitor 18 because of sufficient capacitive reactance in the storage battery. Generally where the load has sufficient capacitive reactance, the capacitor 18 may be omitted.

To help in the explanation of the circuit of FIG. 1, reference is made to FIG. 2 which illustrates a simplified switch concept of the operation. In this FIG. 2 $V_1(t)$ would be the applied alternating voltage source 17 and this could be a 60 Hz power source. Switch S1 is illustrated as a double pole, double throw switch, a mechanical switch to replace the switch means 19 of FIG. 1. This switch is operated in a synchronous manner; that is, at the same frequency as the applied voltage $V_1(t)$. It is assumed to have a minimum transient time between the two contacts and the switch is operated for essentially 180° at the first contact and 180° at the alternate second contact. The resulting output of this circuit is the voltage $Vc$ applied to the capacitor 18 and to the load resistor 36. This capacitor is a DC filter capacitor which may be an electrolytic capacitor for size and cost reduction together with large capacitance. A large value of capacitance would be associated with a small value of capacitive reactance, and because of the small capacitive reactance the capacitor will have essentially a pure DC voltage with a ripple in the order of one-half percent 1 percent as an example. The synchronous switch S1 is operated at a delay angle $\alpha$ with respect to the applied voltage $V_1(t)$. This is illustrated in FIG. 3. By varying the magnitude of this angle $\alpha$, the output power may be varied. The circuit in FIGS. 1 and 2 illustrates an AC to DC circuit with regulated DC output. This principle may also be applied for an AC to AC, DC to AC, or DC to DC circuits, as will subsequently be explained.

The switching of S1 not only produces a substantially constant direct voltage on the capacitor 18, but also produces a substantially square wave voltage $V_2(t)$ on the input to the switch means S1, or in FIG. 1 this could be taken as the voltage across the secondary winding end terminals 25 and 26. This square wave voltage $V_2(t)$ will have a peak magnitude equal to $Vc$. This voltage $V_2(t)$ can be represented by a Fourier series as shown in equation one. $\omega_0$ in equation one would then be the same frequency as $V_1(t)$:

$$V_2(t) = \frac{4Vc}{\pi} \sin(\omega_0 t + \alpha) + \frac{4Vc}{3\pi} \sin 3(\omega_0 t + \alpha) + \ldots \quad (1)$$

Inductor $L1$ in FIG. 2 is shown as a separate inductance element 39 whereas in FIG. 1 it is shown as a part of a leakage reactance transformer 23. It is more convenient in the practical circuit to make this linear inductance $L1$ as a part of the leakage reactance transformer, because it achieves a saving of core material, but in FIG. 2 it has been illustrated as a separate inductance on the primary or input side of the switch means S1 in order to illustrate the basic circuit. Since this inductor $L1$ in FIG. 1 or 2 is a linear element, superposition may be applied to determine $I_L(t)$. If $V_1(t)$ is shorted to zero potential and $V_2(t)$ is then applied to $L1$, the current $I_{L2}(t)$ as illustrated in Equation 2 would then flow through $L1$:

$$I_{L2}(t) = \frac{4Vc}{\pi \omega_0 L1} \cos(\omega_0 t + \alpha) + \frac{4Vc}{9\pi \omega_0 L1} \cos 3(\omega_0 t + \alpha) + \ldots \quad (2)$$

If $V_2(t)$ is then shorted to zero potential and $V_1(t)$ is applied across $L1$, the current $I_{L1}$ as shown in Equation 3 will then flow through $L1$:

$$I_{L1} = \frac{V_1(t)}{\omega_0 L} \quad (3)$$

The resultant current $I_L$ would then be the difference between the current $I_{L1}$ and $I_{L2}'$ as illustrated in Equation 4:

$$I_L(t) = \frac{V_1 \text{ peak}}{\omega_0 L1} \cos \omega_0 t - \frac{4V_c}{\pi \omega_0 L_1} \cos(\omega_0 t + \alpha)$$

$$- \frac{4V_c}{p\pi \omega_0 L_1} \cos 3(\omega_0 t + \alpha) + \ldots \quad (4)$$

Two important facts should be noted, in regard to $I_L(t)$ at this time:

1. a fundamental component and all odd harmonics are present. 2. the harmonics of $I_L(t)$ which are produced by $I_{L2}(t)$, reduce as the square of their value, that is, the third harmonic is one-ninth the magnitude of the fundamental. The reason for this is that at this third harmonic, the impedance is 3 times as large yet the voltage is only one-third that of the fundamental. This is an important advantage of this circuit.

The power transferred in this circuit becomes the time integral of $V_1(t) \times I_L(t)$. This can be simplified by realizing that the time integral of $V_1(t) \times$ the harmonics is equal to zero. Thus, if $V_1(t)$ is purely sinusoidal, the fundamental of $I_L(t)$ is all that must be considered to determine the power flow.

FIG. 3 illustrates the vector diagram of the fundamental voltages of the voltage loop $V_1(t)$; $V_L'(t)$; $V_2'(t)$, the prime notation indicates that we are just concerning ourselves with the fundamentals of these voltages. In FIG. 3, voltage $V_2'(t)$ is shown at a delay angle, (alpha), with respect to $V_1(t)$. The voltage $V_L'(t)$ is then the vector sum of $V_1(t) - V_2'(t)$. It can be seen in FIG. 3 that this voltage actually leads the applied voltage of $V_1(t)$. Because L1 represents a practically pure inductive impedance, the current $I_L'(t)$ is then in quadrature with the voltage $V_L'(t)$. The current obtained from the power source, $V_1(t)$ is then $I_L'(t)$ as shown in FIG. 3 at a power factor angle $\theta$, with respect to $V_1(t)$. The current $I_L'(t)$ can be broken down into two components:

the real component in phase with $V_1(t)$, and, the imaginary component in quadrature with $V_1'(t)$. The real portion of $I_L'(t)$ would be the component which contributes power to the load, $R_L$. In FIG. 3, the current $I_L'(t)$ from source $V_1(t)$ is constructed from superposition of voltages $V_1(t)$ and $V_2'(t)$. Since the current produced by $V_1(t)$ is the vector, $I_{L1}(t)$, in quadrature with $V_1(t)$, no real current is produced by this driving voltage $V_1(t)$. The power transfer, then, must be produced by the real portion of $I_{L2}'(t)$ which current $I_{L2}'(t)$ is in quadrature with the voltage $V_2'(t)$.

It can be seen from the vector diagram of FIG. 3 that the real portion of $I_L'(t)$ is equal to $I_L'(t) \times$ cosine and the real portion of $I_L'(t)$ is also equal to $-I_{L2}'(t)$ times the sine of alpha, where alpha is the angle between $V_2'(t)$ and $V_1(t)$.

Power transferred to the load resistor $R_L$ is then illustrated in Equations 5 and 6:

$$\text{Power} = [V_1][-I_{L2'}(t)] \sin \alpha = I_{dc}{}^2 R_L \quad (5)$$

$$\text{Power} = \frac{.9 V_1 V_c}{\omega_0 L} \sin \alpha = I_{dc}{}^2 R_L \quad (6)$$

In Equation 5 the symbol $V_1$ is used rather than $V_1(t)$ because this is the R.M.S. value of this input voltage rather than the instantaneous voltage with respect to time. Equation 6 is derived from Equation 5 substituting for $I_{L2}'$ the value as shown by the fundamental of Equation 4, and it can be shown that $$\frac{.9 V_c}{\omega_0 L}$$

is the R.M.S. value of the square wave which is on the input to the switch means. It can be seen from Equation 6 that as $R_L$ is varied, $\alpha$ may be varied to maintain the $V_{dc}$ output at a constant voltage; then, by properly controlling the magnitude of $\alpha$, the output voltage may be regulated to a constant for varying loads.

From the vector diagram in FIG. 3, it can be seen that this circuit would have inherent current limit at full load. As load is applied, the current through $L1$ inductor, $I_L'(t)$ will follow the locus of points from A to B in FIG. 3. Maximum power then occurs where $\alpha$ equals 90°. If $\alpha$ equals 90°, and additional load is applied, the output voltage will decrease along line C B.

In Equation 6, it can be seen that decreasing the output voltage decreases the maximum power available, since the maximum power available varies linearly with $V_{DC}'$ the maximum load current in resistor $R_L$ must be a constant. FIG. 4 illustrates the voltage-current characteristics that would be inherent in this type of regulator.

A leakage reactance transformer may be considered the equivalent of an ordinary transformer plus a choke. The reason for this is in the construction of the leakage reactance transformer. It has shunts with air gaps between the primary and second windings. If one considers the operation of a leakage reactance transformer under various load conditions, the similarity to the choke in series to the primary winding of an ordinary transformer is brought out. In the leakage reactance transformer at no load, the turns ratio between the secondary and primary windings is the transformation voltage ratio, the same as in an ordinary transformer. Now if one loads the secondary with a resistance and measures the phase angle of lag of the current relative to the voltage, one determines that there is a definite phase lag of secondary current. This is analogous to resistive loading of an ordinary transformer having a choke in series with the primary. Now if the leakage reactance transformer secondary is loaded to a maximum; namely, a short circuit, the secondary winding current has nearly a 90° phase lag relative to the primary current. Again this is the same action as one obtains with a choke in series with an ordinary transformer.

In an ordinary transformer there is a low reluctance flux path and all flux couples the secondary with the primary winding. In a leakage reactance transformer the shunt establishes a shunt path for the flux so that all the flux does not have to couple the secondary with the primary winding. The magnitomotive force represents energy and that part which is not common with the secondary winding is stored in the air gap and then later in time, e.g., 45° to 90°, is returned as energy and appears in the secondary winding. Thus the above analogy shows that a leakage reactance transformer is the practical equivalent of a choke in series with an ordinary transformer. It is also a more practical and economical solution in the present invention because if a separate choke were to be used, one would have to have large gauge wire in it in order to achieve $I_{L2}$ substantially 90° lagging $V_L$ as shown in FIG. 3. By using the leakage reactance transformer a phase angle of 88° or 89° may be readily achieved merely using the large gauge wire already present in leakage reactance transformer primary windings. This is a double duty of this large gauge wire. Additionally, the transformer laminations and shunts are readily available without making special dies to punch out new or special transformer laminations.

In summarizing the circuit illustrated in FIGS. 1 and 2, the following advantages can be seen at this time:

1. By properly controlling the angle $\alpha$, adjustment of the output voltage may be obtained.
2. By properly controlling the angle $\alpha$, regulation of the output voltage may be obtained for varying load resistances.
3. The input current drawn from the AC source 17 is low in harmonic content, compared to other circuits, such as rectifiers performing the same function.
4. Inherent short circuit protection; if properly designed, the circuit could maintain a continuous short circuit.

The circuit of FIG. 1 is a more complete and practical circuit than the simple circuit used as an illustration in FIG. 2. The circuit of FIG. 1 would have several advantages over the circuit of FIG. 2;

1. S1 may be a single pole rather than a double pole switch.
2. Electrical isolation between the applied voltage, $V_1(t)$, and the output voltage Vc is obtained by means of the transformer 23.
3. The turns ratio of the transformer 23 may be a value other than that of unity permitting operation of the output voltage at much higher or much lower voltages than $V_1(t)$.
4. The linear inductance L1 is formed as a part of the transformer 23 by making it a leakage reactance transformer with shunts between the primary and secondary windings of this transformer. This makes it a compact installation and makes it relatively easy to obtain a phase lag of the current relative to the voltage of 88° or 89° without the necessity of large gauge conductor in the winding of a separate inductance, the large gauge wire already present in the transformer does double duty.

Figure 5B:
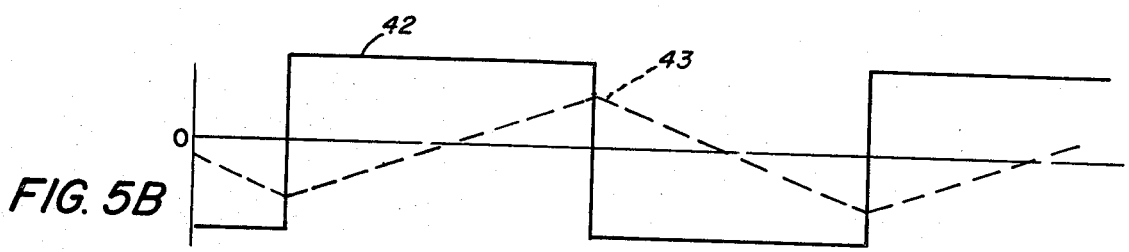
Figure 5C:
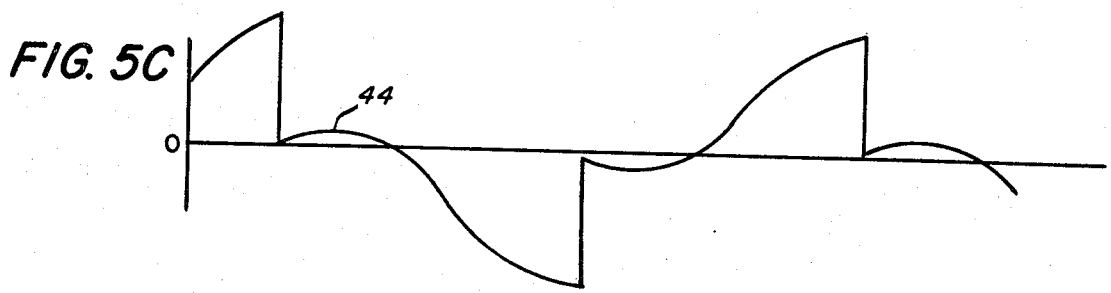

FIG. 5 illustrates the voltages and currents plotted with respect to the time which may appear in the circuits of FIGS. 1 and 2. The input voltage $V_1(t)$ is illustrated in FIG. 5A as a sine wave as shown by the curve 40. The current caused to flow by this input voltage is $I_L(t)$ illustrated by the curve 41. This current is illustrated as flowing at some phase angle of lag $\theta$, for example, about 45° to correspond to FIG. 3. FIG. 5B illustrates the substantially square wave of voltage $V_2(t)$ shown by a curve 42 and curve 43 shows the imaginary current $I_{L2}'(t)$ which flows at a quadrature phase angle relative to $V_2(t)$. FIG. 5C illustrates the instantaneous voltage $VL(t)$ by a curve 44 and this shows that this voltage is the instantaneous voltage between $V_1(t)$ and $V_2(t)$. These Figures help to illustrate that the inductance, whether a separate inductance 39 as shown in FIG. 2 or whether built into the leakage reactance transformer 23 as shown in FIG. 1, absorbs the instantaneous difference between the input voltage $V_1(t)$ and the substantially square wave voltage $V_2(t)$ at the input to the switch means 19.

In FIG. 1, compared with FIG. 2, the switch S1 of FIG. 2 is replaced with diodes 30, 31 and transistors 34 and 35. In this scheme, transistors 34 and 35 perform the switching function of S1. Diodes 30, 31 provide a bi-lateral path for current flow to the load, at least during part of each half cycle.

In FIG. 1 assume that the center tap 27 is positive relative to the secondary winding terminal 26. For this half cycle current flows to the right through the load capacitor 18 down through diode 31 and returns to the secondary winding terminal 26. As shown in FIGS. 5A and 5B, however, this is easily understood when both $V_1(t)$ and $V_2(t)$ are positive. At a point 46, at 180° on the time base of the input voltage, this input voltage goes negative. The current $I_L(t)$ is still positive as shown by curve 41 and hence current still flows in the same aforementioned path. At a point 47, the input current $I_L(t)$ goes negative and this reverses the current in both the primary and secondary windings of the transformer. For the remaining time until a point 48 is reached at which $V_2(t)$ goes negative, this reverse current flows out of the positive terminal of the capacitor 18, tending to discharge same, through the lower half of the secondary 24 and through the transistor 35 to return to the capacitor 18. To accomplish this, the control circuit 38 conditions the transistor 35 for conduction during the entire half cycle when $V_2(t)$ is positive and conditions transistor 34 for conduction for the entire half cycle when this $V_2(t)$ is negative. The control circuit in FIG. 1 senses the output voltage, Vc, and compares this against a reference. The error between the output voltage Vc and the reference voltage controls the phase angle $\alpha$ to maintain Vc at a constant potential.

It is important to note that transistors 34 and 35 could be replaced by any switching type device. If a commutating circuit were provided, thyristors could replace transistors 34 and 35.

Figure 6:
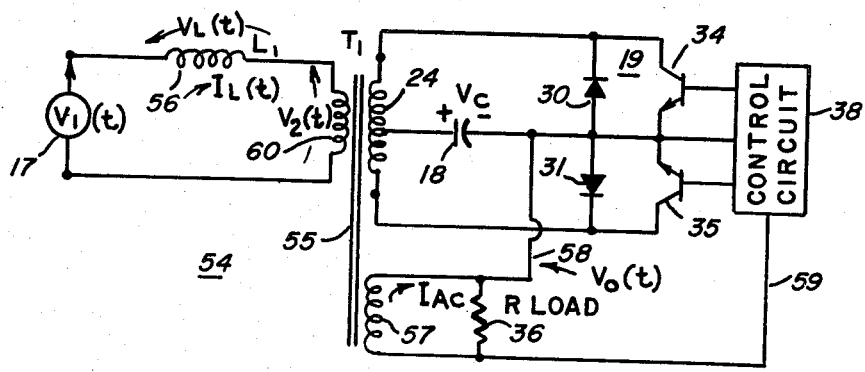
FIG. 6 is a schematic diagram of an alternative simplified circuit.

FIG. 6 is a modification of FIG. 1 in a regulator circuit 54. In FIG. 6, the resulting output is the square wave regulated voltage of the same frequency as $V_1(t)$, the input voltage. In FIG. 6 an ordinary transformer 55 rather than a leakage reactance transformer has been used in order to show a variation. A separate inductance 56 is used as in FIG. 2. The rectifier circuit to the capacitor 18 is the same as in FIG. 1 but the transformer 55 now has a second secondary or tertiary 57 across which the load resistor 36 is connected. Feedback conductors 58 and 59 supply the load voltage to the control circuit 38. The switch means 19 acts as a full wave rectifier to develop a substantially constant direct voltage across the capacitor 18. This is reflected to the input of the switch means as a substantially square wave alternating voltage. This input to the switch means 19 is across the secondary winding 24 and with this square wave on the secondary, this is also reflected as a square wave to the primary 60 of this transformer and also forces the tertiary winding 57 to likewise have this square wave alternating voltage thereon. In this configuration the output voltage $V_o(t)$ is compared by the control circuitry with a reference voltage. The error voltage developed between $V_o(t$ and the reference voltage is again used to control the phase angle $\alpha$; thus, $V_o(t)$ is maintained at a constant potential. FIG. 6 is then an AC to AC application of the regulator circuit of FIG. 1.

Figure 7:
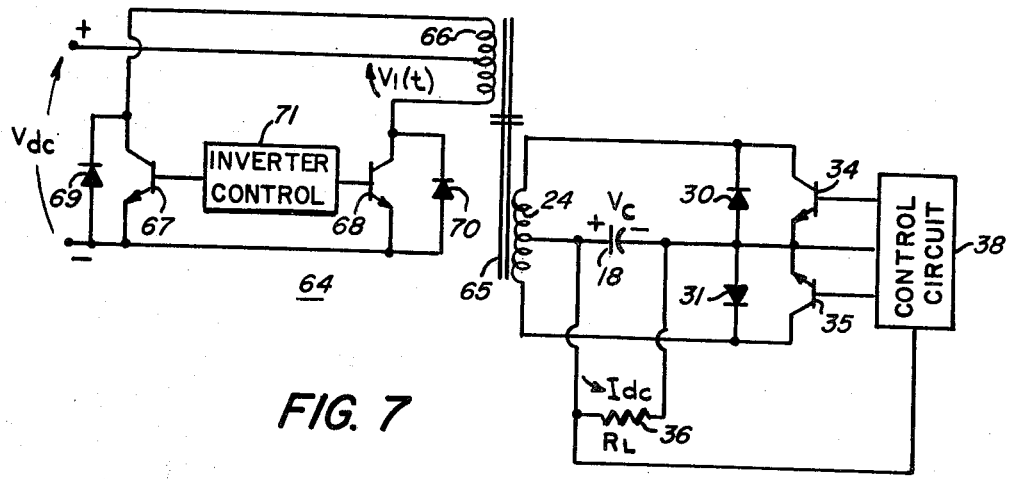
FIG. 7 is a schematic diagram of another modification.

FIG. 7 illustrates a regulator circuit 64 providing a DC to DC voltage. Note that transformer 65 in FIG. 7 is a leakage reactance transformer as in FIG. 1. In this circuit, the inductor L1 of FIG. 2 is built into the transformer 65. This could be done in the circuit in FIG. 2, thus eliminating inductor L1. The voltage $V_1(t)$ applied to the primary 66 of transformer 65 is a square wave of peak value equal to $V_{dc}'$ the applied voltage. This square wave is produced by the inverter action of transistors 67 and 68 and diodes 69 and 70 in conjunction with the inverter control circuit 71. The secondary circuit of FIG. 7 is the same as that shown in FIG. 1; this secondary circuit results in a regulated output voltage, $V_c$. FIG. 7 then produces a DC output voltage which is regulated for load changes or changes in the input DC voltage.

Figure 8:
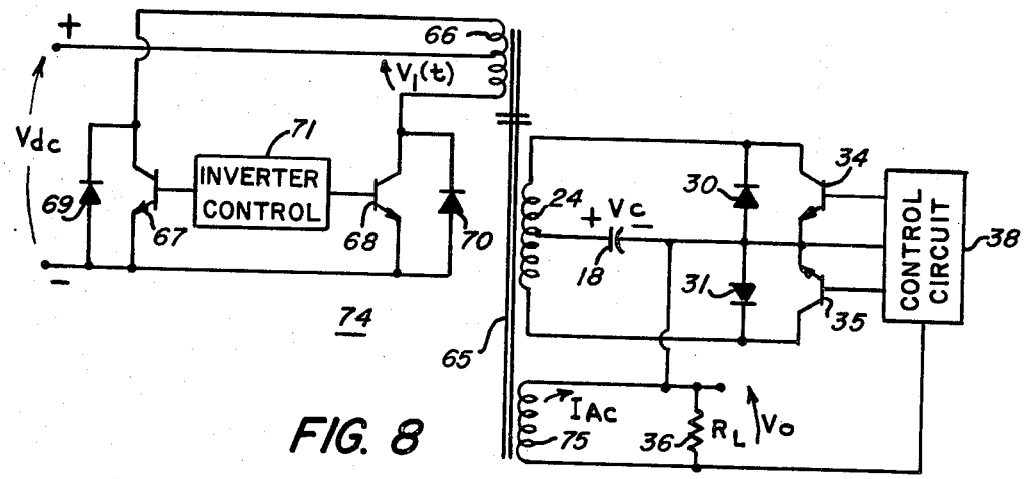
FIG. 8 is a schematic diagram of still another modification.

FIG. 8 illustrates a regulator circuit 74 for a DC to AC voltage. The circuit in FIG. 8 is the same as in FIG. 7, with the addition of an AC output tertiary winding 75 on the secondary side of the leakage reactance transformer. This additional winding 75 supplies a square wave regulated output voltage to the load resistor, $R_L$. The control circuit senses the output voltage $V_0(t)$ and compares this against a reference. The difference voltage is used to control the delay angle $\alpha$, thus regulating the output voltage $V_0(t)$. This circuit then produces a constant output AC voltage for variations in load resistance and DC input voltage.

The following points are important in summarizing the foregoing circuits:

1. These circuit configurations may be used with either an AC or DC input and may provide either an AC OR DC output.

2. The switching device is not limited to transistors. Any switching scheme which provides a bi-lateral current path will work in this circuit.

3. The reactor L1 illustrated in FIG. 2, may or may not be a separate component. In any of the figures shown, this reactance could be incorporated in the transformer.

4. In circuit configurations where the resulting output is a DC voltage, this DC output could be obtained from a separate winding. In FIGS. 1 and 7, the DC output is obtained from the same winding as that used by the regulator circuit 16, which inverts or reflects the capacitance of DC capacitor 18 as an AC capacitance. This DC voltage could be obtained from a separate winding, with a separate set of rectifiers.

Figure 13:
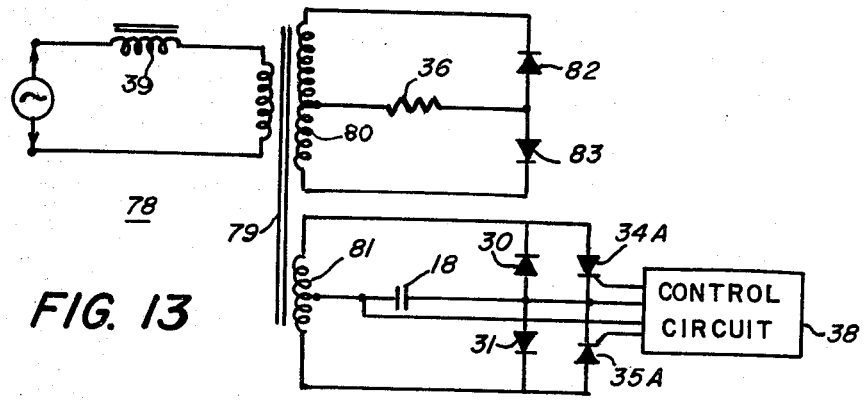

FIG. 13 illustrates a regulator circuit 78 embodying this modification. The transformer 79 is shown s having a first and a second secondary 80 and 81. Secondary 81 supplies rectified energy to the capacitor 18 the same as described before for FIG. 1. The secondary 80 has a separate set of diodes 82 and 83 supplying rectified energy to the load resistor 36. This could be a definite advantage for high voltage application since the switches would then not be required to operate at the high output voltage.

It should be noted that all of the applications shown thus far are highly efficient. Regulation is produced by switching devices. No components operate in a variable state of conductance.

Also it should be noted that $V_1(t)$ in the circuits shown in FIGS. 7 and 8 is not purely sinusoidal. The statement made above that the time integral of $V_1(t) \times$ harmonic currents is equal to zero, then does not hold true for this situation.

As stated above, the harmonic currents present in the primary of the transformer in FIGS. 7 and 8 do contribute to the load power. If we refer to FIG. 2 and let $V_1(t)$ be a square wave, the circuit operation would be the same as that shown in FIG. 7.

Figure 9A:
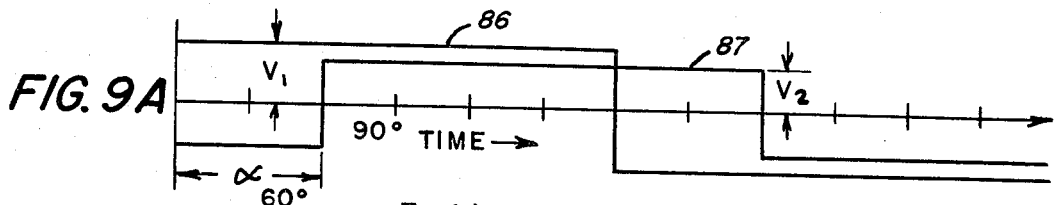
FIG. 9 is a graph of voltage and current plotted against time.
Figure 9B:
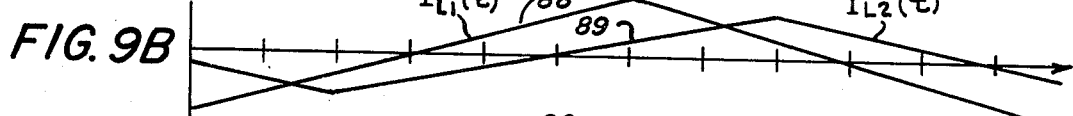
Figure 9C:
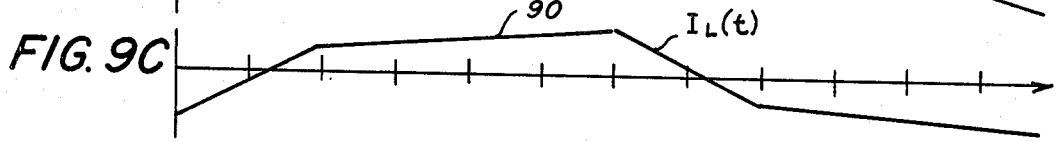

In FIG. 9A, $V_1(t)$ is shown as a square wave 86 of magnitude $V_1$. $V_2(t)$ is also shown as a square wave 87 of magnitude $V_2$, $V_2(t$ being at a delay angle $\alpha$ with respect to $V1(t)$. Superposition may be applied to determine $I_L(t)$ as it was above for FIG. 2. FIG. 9B illustrates at 88 and 89, respectively, $I_{L1}(t)$ and $I_{L2}(t)$, the currents produced by $V_1(t)$ and $V_2(t)$, respectively. FIG. 9C illustrates $I_L(t)$, a summation of $I_{L1}(t)-I_{L2}(t)$. It should be noted in FIG. 9B that $I_{L1}(t)$ contributes no power to the output since the time integral of $I_{L1}(t)$ and $V_1(t)$ is zero. Power flow to the load must then be a function of $V_1(t)$ and $I_{L2}(t)$. Power flow to the load is then the time integral of $V_1(t) \times I_{L2}(t)$. It can be seen then from FIGS. 9A and 9B, that maximum power flow would occur at $\alpha = 90°$. Power flow to the load, and thus output regulation, can then be obtained for the circuits in FIGS. 7 and 8.

Figure 12:
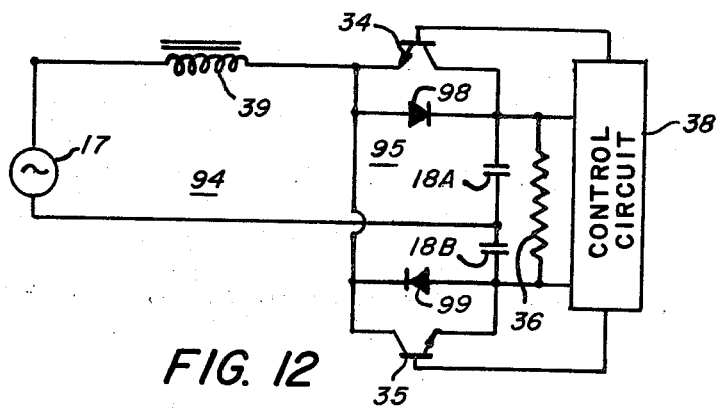

FIG. 12 illustrates a regulator circuit 94 wherein a transformer is not used and yet the double pole, double throw switch of FIG. 2 is simplified to a single pole double throw switch, and full wave current flows from the input. In this case the switch is shown as being accomplished by a rectifier circuit 95 which includes rectifiers 98 and 99. The input to the rectifier circuit 95 is from the voltage source 17 and through the separate inductance 39. The output of the bridge rectifier 95 is to the energy storage device or capacitors 18A and 18B and the load resistor 36 in parallel. A control circuit 38 is again used to control the alternate conductivity periods of the transistors 34 and 35 which are connected in inverse parallel with the diodes 98 and 99, respectively.

If the basic circuit described in FIG. 2 is operated at no load, then the angle $\alpha$ would be nearly zero, since power flow to this circuit would be only to supply the losses within the circuit. If the voltage $V_2'(t)$ is equal to $V_1(t)$ at this time, then the input exciting current would be nearly zero.

Figure 10A:
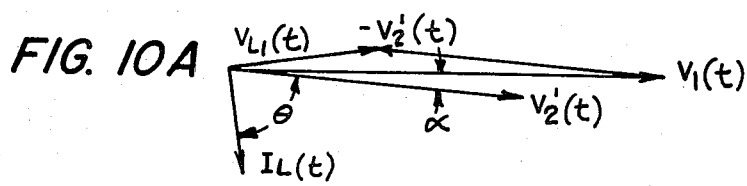
FIG. 10 is a vector diagram of current and voltages in the circuit.
Figure 10B:
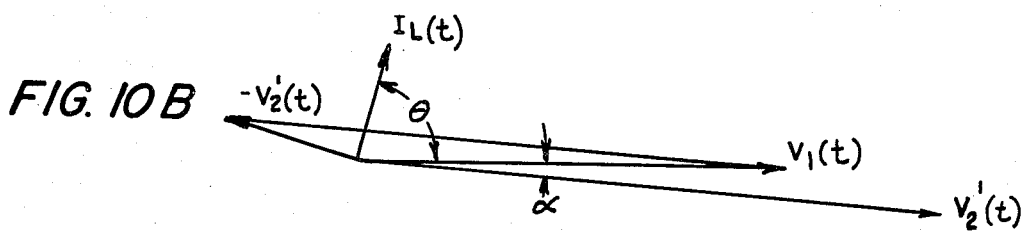

In FIG. 10A, the no load case where $V_2'(t)$ is less than $V_1(t)$ is shown. Note that the resultant current $I_L(t)$ is nearly lagging 90°. In FIG. 10B, $V_2'(t)$ is greater than $V_1(t)$; in this case, the resulting current $I_L(t)$ is very nearly leading $V_1(t)$ by 90°. At no load then the regulator circuit will draw a leading or lagging power factor current, depending upon the value of $V_2'()$. With respect to FIG. 2, it was shown that $V_2(t)$ is directly proportional to $V_c$ the output voltage. By properly controlling the DC output voltage, the regulator circuit then may be made to appear as a leading or lagging power factor to the input power source.

Figure 11:
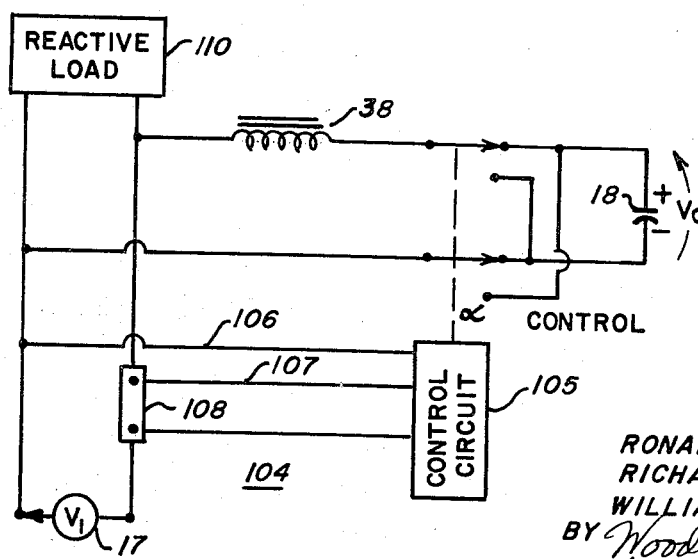
FIGS. 11–17 are schematic diagrams of further embodiments.

FIG. 11 illustrates an application of this principle in a regulator circuit 104. In FIG. 11, a control circuit 105 senses the line voltage $V_1(t)$ by feedback conductors 106 and 107 and the resultant line current, $I(t)$ by a shunt 108. These two quantities are compared by the control circuit 105 to obtain the resultant power factor, $\theta$. This power factor $\theta$ would be the combined power factor of the regulator circuit 104 and the reactive load 110 shown at the top OF FIG. 11. The control circuit adjusts the phase angle $\alpha$, of the synchronous switch S1 to maintain the resultant power factor, $\theta$, very near unity. Thus, if the reactive load 110 were lagging in power factor, the control circuit 105 would adjust the value of $V_2'(t)$ to a value greater than the applied voltage $V_1(t)$. The value of $V_2'(t)$ would be such that $I_L(t)$ would be leading and equal to the value of the lagging current of the reactive load, for automatic power factor correction.

Figure 14:
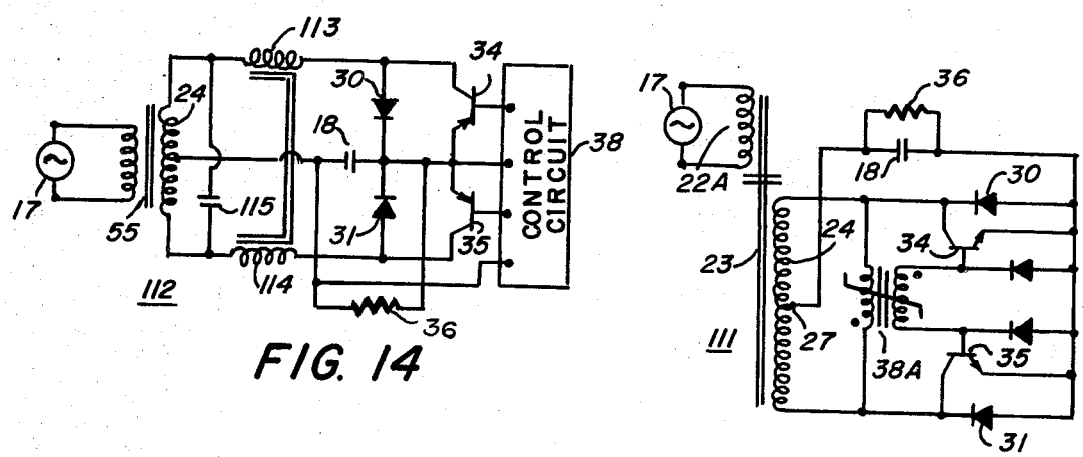

FIG. 14 illustrates a regulator circuit 112 wherein an ordinary transformer 55 is used which has a secondary 24 to supply energy to the load capacitor 18 and the load resistor 36. In this respect it is similar to the circuit of FIG. 6, however, in FIG. 14 there is no inductance in the primary side of the transformer, instead there is an inductance on the secondary side including windings 113 and 114 mounted on a common core. This permits establishment of a substantially pure direct current across the capacitor 18 with a substantially square wave on the input to the switch means. A regulated DC voltage will then be applied to the load resistor 36. The inductance 113-114 performs the function of absorbing the instantaneous voltage difference between this square wave on the switch input and the sine wave of the AC input 17. An optional capacitor 115 may be connected across secondary 24 for more filtering. Thus this circuit permits a closer approximation to the sine wave of voltage to appear on the transformer 55.

Figure 15:
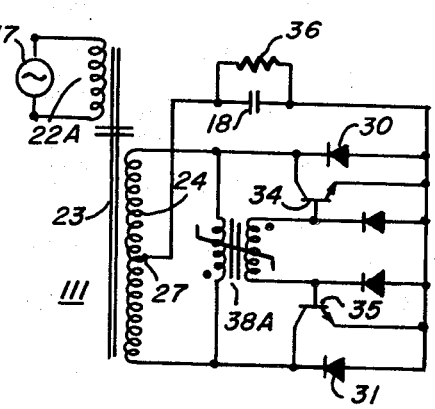

FIG. 15 illustrates a simple circuit 111 utilizing the transistors 34 and 35. A control device 38A is a small saturating transformer with the primary connected across the secondary 24 of the leakage reactance transformer 23. This saturating transformer 38A is required to supply only the base drive for the two transistors 34 and 35. Accordingly, it represents a relatively small portion of the volt amperes of the unit. Although this saturating transformer is indicated schematically as being of a square loop type material, this is not an absolute necessity. This saturating transformer 38A will turn on the respective transistors 34 and 35 for alternate 180° conduction of each. As the voltage of DC capacitor 18 tries to rise, so does the voltage across secondary 24 and the primary of saturating transformer 38A. This saturates the core earlier, turning on the respective transistor 34 or 35 earlier, i.e., a smaller delay angle α, and hence lowers the voltage across capacitor 18. Therefore this simple circuit will regulate the output appearing across the DC capacitor 18 and the load resistor 36. For voltage adjustment, taps may be provided on the secondary 24 or as shown, may be provided on the primary winding 22A.

The present invention provides a means for utilizing the small size advantages of a standard leakage reactance transformer with the high efficiency of a switching type regulator. These two circuits are combined in a unique way which allows the high volumetric efficiency of electrolytic capacitors to be fully utilized. Using this system we are able to operate electrolytic capacitors at one voltage level and then by standard transformation reflect this capacity to other voltage levels.

Because the volume of an electrolytic capacitor is proportional to the product of the capacitance times the voltage and its stored energy is proportional to the product of the capacitance times the voltage squared, it is seen that higher voltage operation of filter capacitors is more efficient than low voltage. Assume for instance that a 5-volt level must be filtered. The required stored energy would be proportional to $C_1V_1^2$ at 5 volts. If the same stored energy were obtained at a 50-volt level, we would have a theoretical volume reduction in the filter capacitors of 10:1 because the volume is directly proportional to the voltage ratio of 50:5 but the energy stored is proportional to the voltage squared ratio, 2,500:25.

Figure 16:
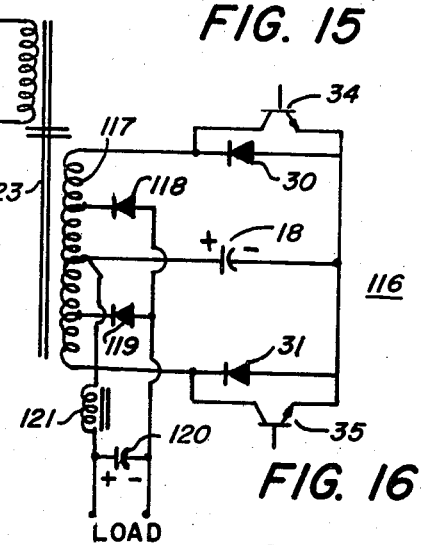

This type of system is illustrated in FIG. 16 in a regulator circuit 116. Here a leakage reactance transformer 23 has a secondary winding 117 with high voltage end terminals, for example, at 50 volts relative to the mid-tap for charging the DC capacitor 18. Low voltage taps on the secondary 117 are connected by diodes 118 and 119 for full-wave rectification to a load capacitor 120. An optional choke input filter 121 may be provided to lessen the ripple content of the output voltage appearing across the capacitor 120. Only 5 volts may appear across the load capacitor 120, for example, and in effect the DC capacitor 18 operating at high voltage is reflected to effectively be in parallel with the output capacitor 124. This would be useful in low voltage high current applications.

The system described provides a means reflecting DC capacity to any voltage desired. The controlling circuit may be used to operate economical 50-volt capacitors and reflect them to 2 or 3-volt, for example, levels to take advantage of the volume gains. Or the same 50-volt control system might be used to reflect capacitance to a higher voltage level where the price of filtering becomes prohibitive.

Figure 17:
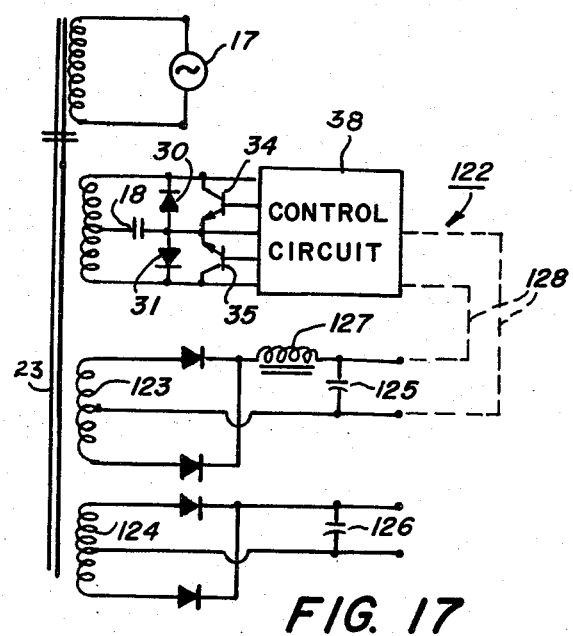

It also becomes possible to operate a choke input filter on the levels where capacity is being reflected to, to economically achieve low ripple outputs. FIG. 17 illustrates such a regulator circuit 122 again utilizing the leakage reactance transformer 23 and the control circuit 38 to control transistors 34, 35, which together with the diodes 30 and 31 will supply a DC voltage across the DC capacitor 18. This control circuit accordingly controls the core of the transformer 23 for no load regulation. Thus, secondaries 123 and 124 may be a different voltage levels operating through full wave rectifier circuits to DC load capacitors 125 and 126, respectively. An optional choke 127 may be used in either of the secondaries 123 and 124 to economically achieve low ripple output by means of this choke input filter. Further, if desired, the DC drop in the filter choke, diodes, etc. may be compensated for by an external feedback loop as by leads 128. Because of this provision for a remote or external feedback loop, this system can be made into a programmed bulk power supply to feed precision series or shunt transistor regulators. The bulk supply could be caused to maintain a fixed voltage drop across the series pass transistors for instance, or any other quantity desired.

DESCRIPTION OF THE PREFERRED EMBODIMENT

Figure 18:
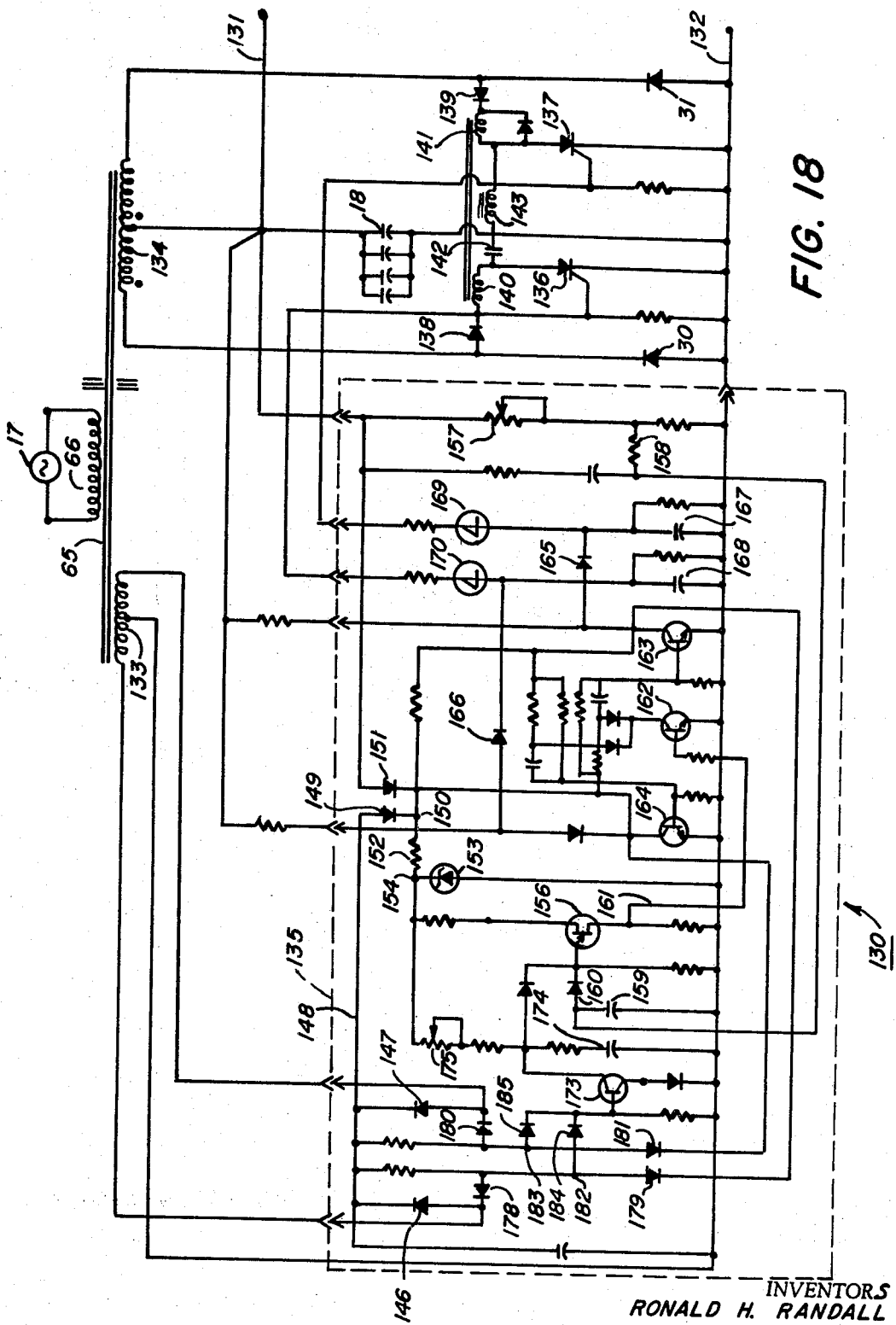
FIG. 18 is a schematic diagram of the preferred embodiment.

FIG. 18 illustrates a complete regulator circuit 130 which embodies the invention and has been constructed and is operational to control a DC output voltage on leads 131 and 132 as supplied by the voltage source 17. A leakage reactance transformer 65 has a primary winding 66 connected to the voltage source 17 and has a secondary winding 133 and 134. Secondary winding 133 is on the primary or unregulated side of the transformer shunt and supplies power to a control circuit 135 which controls the firing of thyristors 136 and 137. These thyristors take the place of the transistors 34 and 35 in the regulator circuit 16 of FIG. 1. Power transistors may be used in place of the thyristors 136 and 137 and in fact the control circuit 135 has been used successfully to control either thyristors or transistors, without any modification to this control circuit. Diodes 30 and 31 are connected effectively in inverse parallel with the thyristors 136 and 137, respectively, to the two ends of the secondary winding 134. The lead 131 is connected to the center tap of the secondary winding 134 and the DC output capacitor 18 is connected across these output leads 131 and 132, with the anodes of the diodes 30 and 31 connected to this output lead 132. Protective diodes 138 and 139, together with the two windings 140 and 141 on a commutating reactor are a part of the commutating circuit to commutate the thyristors 136 and 137. Also, a part of the commutation circuit is a commutating capacitor 142 and an inductance 143 which limits the rate of rise of the current around the loop including the two thyristors. The inductance of the reactors 140 and 141 is quite small; hence, this is why it can be stated that the thyristors 136 and 137 are effectively in inverse parallel with the diodes 30 and 31, respectively.

The control circuit 135 establishes a variable delay angle alpha of firing the thyristors 136 and 137, and as has been explained above, this varies the output voltage across the capacitor 18 which is the output voltage on the leads 131 and 132. In an ordinary phase controlled rectifier, increasing delay of the firing point relative to the anode voltage, decreases the output voltage. In the present circuit increasing delay of the firing angle, alpha, of the thyristors 136 and 137, increases the output voltage.

The control circuit is supplied with power from the secondary winding 133 and it will be noted that the center tap thereof is connected to the output lead 132 which may be considered a ground lead. The two opposite ends of the secondary winding 133 supply DC power to the control circuit 135 by means of the rectifier diodes 146 and 147 supplying full-wave rectified power on a lead 148 which is passed by diode 149 to a DC supply terminal 150. This full-wave rectifier circuit supplies DC power only during start-up because it will be noticed that a diode 151 supplies power to this DC supply terminal 150 from the output lead 131 once the output voltage is up to the regulated value. Voltage at this DC supply terminal 150 passes through a resistor 152 and a break-down diode 153 to establish a regulated, filtered unidirectional voltage at DC supply terminal 154. This regulated voltage is supplied to a unijunction transistor 156. The output voltage on lead 131 passes through an output adjustment rheostat 157 and a resistor 148 to charge capacitor 159. The capacitor is connected through a diode 160 to the emitter of the unijunction transistor 156. When the capacitor 159 charges to a sufficient value, the unijunction transistor 156 will fire delivering a pulse on lead 161 to cause conduction of a transistor 162. Transistors 156 and 162 operate at twice line frequency; that is, if 60 Hz is applied to the primary winding 66, then the transistors 156 and 162 operate at 120 Hz.

The transistor 162 operates a flip-flop which includes transistors 163 and 164 so that whenever one of these transistors is turned on, it turns off the other. The associated circuitry above these transistors in FIG. 18 establishes the flip-flop circuit. Whenever transistor 164 is turned off, then current flows from DC lead 131 through a diode 166 to charge a capacitor 168. Similarly when the transistor 163 is not conducting, current from the DC lead 131 is passed through a diode 165 to charge a capacitor 167. Upon charging sufficiently the capacitors 167 and 168 cause conduction through silicon unilateral switches 169 and 170, respectively, which lead to the gates of the thyristors 137 and 136. This current fires the respective thyristors. Reverting to the unijunction transistor 156 and capacitor 159, it will be noted that if the load decreases and the output voltage tends to rise this will charge the capacitor 159 at a higher rate and hence, the transistors 156 and 162 will conduct earlier in the cycle. This means that the delay angle alpha will be less. This means that the thyristors 136 and 137 are fired with a smaller delay angle alpha and as explained above, this decreases the output voltage on leads 131 and 132.

A synchronizing circuit is also part of the control circuit 135. A transistor 173 is turned off at the beginning of each half cycle. This permits a capacitor 174 connected across the output of the transistor 173 to commence charging at the beginning of each half cycle. An adjustable rheostat 175 is connected in the charging circuit to this capacitor 174 and is adjusted so that the capacitor 174 will reach the firing voltage of the unijunction transistor 156 at a 90° delay. This assures that the delay angle alpha cannot be increased beyond a 90° delay angle and thus establishes an automatic current limit; thus, in FIG. 3 the vector $-I_{L2}'$ will remain at the 90° angle and decrease along the line CB. A part of the synchronizing circuit includes a NOR gate including diodes 178 and 179 and another NOR gate includes diodes 180 and 181. Diode 178 senses the potential of one-half of the secondary winding 133 and diode 180 senses the potential of the other half of this secondary winding. Diodes 179 and 181 sense the potential on the output to the flip-flop 163–164. The NOR gate 178–179 thus compares the potential of one-half of the secondary winding with the potential on one-half of the flip-flop. This comparison is made at a comparison terminal 182 and if this terminal 182 is positive, then there is conduction through a diode 184 to cause conduction of transistor 173 and hence discharge the capacitor 174. Similarly the diodes 180 and 181 compare the potential of the other half of the secondary winding 133 relative to the other half of the flip-flop 163–164. If the voltage at a comparison terminal 183 is positive, then there is conduction through a diode 185 to cause conduction of the transistor 173 to again discharge the capacitor 174 on the other half cycle. Thus, regardless of the delay angle alpha, whenever the flip-flop 163–164 is actuated, or whenever the voltage polarity on secondary 133 reverses, then the transistor 173 will conduct and discharge capacitor 174 so that it starts over again to charge. Secondary 133 has a sine wave voltage thereon of the same shape as source 17, and is unregulated, being on the primary side of the shunt. Thus at the beginning of each half cycle, the voltage reverses on the secondary 133 and this will cause conduction of either diodes 178 or 180, thus assuring that the transistor 173 is turned off at the beginning of each half cycle. It is turned off again whenever the flip-flop flips, which will be at the delay angle alpha thereafter.

From the above description of the many different modifications of the invention, it will be clear that many advantages are inherent in the regulator circuits disclosed.

The only capacitors that are used in the power system are those for filtering in the load (DC) circuit. Since they operate on DC only, electrolytic types may be used.

No voltages are necessary higher than line or load for proper operation. If a center-tapped load circuit is used, twice load voltage would be present.

By proper control circuitry, load voltage, current, power or any other such parameter may be controlled or regulated.

A wide range of adjustment of output voltage or current is possible. Typical values are ±25 percent.

Operation from no load to full load and beyond to a short circuit is inherent in the circuit. No bleeders for light loads are required in order to maintain regulation.

Comparison of the present regulator circuit with conventional ferror-resonant circuits does point up some of the definite advantages of the present invention. Some of these points are listed as:

1. No resonant capacitor winding is needed, thus eliminating a large size and cost factor for the magnetic components.
2. No AC capacitors are required. If SCR's or similar force commutated devices are used for the switching elements, a small AC capacitor may be used in the commutating circuit. Even in these applications the AC capacitors will be found to be only a fraction of that required for the standard ferror-resonant regulator.
3. No portion of the magnetic circuit needs to operate at or near saturation, thus drastically reducing core losses and negating the need for special laminations and grades of steel.
4. Operation at frequencies higher than 60 Hz is quite feasible, for example, 400 Hz.
5. Very high or low VA units are possible with the limiting factors being available semiconductors rather than the relatively inflexible magnetic circuits.
6. The external magnetic field present around the transformer or reactor core is much lower than around the saturating core of the ferro-resonant regulator. This is quiet important in high density packaging where flux sensitive components, such as amplifiers, other magnetic devices, cathode ray tubes, etc. are present. In the present regulator nearly all the flux will be contained in the core.

Poly-phase applications are also possible with the particular advantage being that the output voltage would be lower in ripple content.

The very real advantages of leakage reactance transformers can be incorporated in the magnetic circuit for this design. Besides the high material efficiency, we are also able to use readily available standard laminations.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A regulator circuit operable from an AC input, comprising in combination,
    capacitive reactance means,
    switch means,
    means to charge said capacitive reactance means of one polarity from the AC input through said switch means periodically actuated at a frequency proportional to the frequency of the AC input,
    means conditioning said switch means for bi-directional conduction throughout substantially 180° of each half cycle of the AC input,
    and means to absorb any instantaneous difference in voltage between the voltage of the AC input and the voltage at the input to said switch means.

2. A regulator circuit as set forth in claim 1, including means to shift the phase of the conduction periods of said switch means relative to the AC input.

3. A regulator circuit as set forth in claim 1, including means to obtain an output voltage from either the capacitive reactance means or the input to said switch means.

4. A regulator circuit as set forth in claim 1, including a transformer having a primary winding connected to the AC input and having a secondary winding connected to said switch means,
    and means including said transformer to reflect the one polarity charge on said capacitive reactance means through said transformer as a bi-polarity charge in the alternating voltage on the primary winding of said transformer.

5. A regulator circuit as set forth in claim 1, including means to connect a load circuit to said regulator circuit,
means to sense the power factor of the load circuit,
and means to control the angle of phase lag of said switch means conduction periods relative to the AC input in accordance with the power factor of said load circuit to control same.

6. A regulator circuit as set forth in claim 1, within said conditioning means establishes charging said capacitive reactance means during a part of each half cycle.

7. A regulator circuit as set forth in claim 6, including means to establish bi-directional conduction through said switch means to permit discharging said capacitive reactance means during another part of each half cycle.

8. A regulator circuit as set forth in claim 1, wherein said conditioning means establishes discharging said capacitive reactance means during part of each half cycle.

9. A regulator circuit as set forth in claim 6, including means to permit discharge at either the beginning or the end of each half cycle.

10. A regulator circuit as set forth in claim 1, wherein said periodic actuation of said switch means and the one polarity charge on said capacitive reactance means establishes substantially a square wave of voltage on the input to said switch means.

11. A regulator circuit as set forth in claim 10, including a transformer having windings connected between the AC input and the input to the switch means,
and said substantially square wave of voltage appearing on the windings of said transformer.

12. A regulator circuit as set forth in claim 11, including means to establish an alternating voltage output from said transformer.

13. A regulator circuit as set forth in claim 10, wherein said absorbing means includes reactive means to absorb any instantaneous difference in potential between the AC input and said substantially square wave of voltage at said switch means input.

14. A regulator circuit as set forth in claim 13, wherein said absorptive reactive means is an inductive reactance between the AC input and the input to said switch means.

15. A regulator circuit as set forth in claim 13, wherein said absorptive reactive means is a part of a leakage reactance transformer supplying said switch means.

16. A regulator circuit as set forth in claim 1, wherein said switch means is periodically actuated at a frequency equal to the frequency of the AC input.

17. A regulator circuit, comprising in combination,
input terminals adapted to be connected to an alternating voltage source,
a DC storage device,
double throw switch means having an input from said input terminals and connected to said storage device,
control means connected to control said switch means for conduction at the same frequency as the alternating voltage source and conducting alternately for substantially 180° of the alternating voltage source to apply a direct voltage to said storage device,
said direct voltage on the storage device reflecting to the input of said switch means as a substantially square wave alternating voltage,
reactance means connected between said input terminals and said switch means input to absorb any instantaneous voltage difference between said square wave alternating voltage and the alternating voltage on said input terminals,
and an output connected to receive a voltage in accordance with the direct voltage across said storage device or the square wave alternating voltage on the switch input.

18. A regulator circuit as set forth in claim 17, wherein said control means establishes a substantially constant direct voltage on said storage device.

19. A regulator circuit as set forth in claim 17, wherein said switch means conducts bi-directional current at least part of each half cycle.

20. A regulator circuit as set forth in claim 17, wherein said switch means conducts bi-directional current on each throw of the switch means for at least part of each half cycle.

21. A regulator circuit as set forth in claim 17, including means to vary the phase angle of the leading edge of the square wave on said switch input relative to the alternating voltage input to vary the magnitude of the voltage on said output.

22. A regulator circuit as set forth in claim 17, including means to vary the phase angle of lag between substantially zero and 90° of the leading edge of said square wave on said switch input relative to the alternating voltage input in order to vary the magnitude of the voltage on said output.

23. A regulator circuit as set forth in claim 17, wherein said reactance means is an inductive reactance.

24. A regulator circuit as set forth in claim 17, wherein said output is connected to receive an alternating voltage in accordance with the alternating voltage across said switch means input.

25. A regulator circuit as set forth in claim 17, wherein said storage device is a capacitor.

26. A regulator circuit as set forth in claim 17, including a transformer having primary and secondary winding means,
and means connecting said secondary winding means to said switch means input and means to connect said primary winding means to said input terminals.

27. A regulator circuit as set forth in claim 26, wherein said reactance means is an inductive reactance included as a part of said transformer.

28. A regulator circuit as set forth in claim 26, wherein said transformer is a leakage reactance transformer having an effective inductive reactance in the primary circuit.

29. A regulator circuit as set forth in claim 17, wherein said output is output terminals connected in parallel with the switch means input,
means to sense a condition of a load connected to said output terminals,
and means to control the phase angle of lag of the leading edge of the square wave on the switch input relative to the alternating voltage input to control the power factor of the combined load and regulator circuit.

30. A regulator circuit as set forth in claim 29, including means to control the value of the voltage across said energy storage device to control the power factor of the combined load and regulator circuit.

31. A regulator circuit as set forth in claim 29, including feedback means responsive to the voltage and the current of the load to determine the power factor of the load.

32. A regulator circuit as set forth in claim 17, wherein said switch means includes semi-conductor devices.

33. A regulator circuit as set forth in claim 32, including inverse parallel connection of semi-conductor devices.

34. A regulator circuit as set forth in claim 32, including means connecting said switch means to provide full wave rectification from said input terminals to said storage device, and inverse parallel connection of semi-conductor devices in each half of the full wave circuit.

35. A regulator circuit as set forth in claim 17, wherein said output is connected to receive a direct voltage in accordance with the direct voltage across said storage device.

36. A regulator circuit as set forth in claim 35, including a transformer having a primary winding and energizing said switch input,
a separate inductive reactance as said reactance means connected in circuit between said input terminals and said primary winding.

37. A regulator circuit as set forth in claim 35, including a direct voltage input,
and an inverter operating from said direct voltage input to supply an alternating voltage to said input terminals.

38. A regulator circuit as set forth in claim 17, wherein said output is an alternating voltage output derived in accordance with the voltage across said switch input.

39. A regulator circuit as set forth in claim 38, including a transformer having primary and secondary winding means with said secondary winding means connected to said switch input, and means to connect said primary winding means to said input circuit.

40. A regulator circuit as set forth in claim 39, including a tertiary winding on said transformer, and means connecting said output to said tertiary winding.

41. A reactor circuit as set forth in claim 40, including a separate inductive reactance as said reactance means connected between said input terminals and said primary winding.

42. A regulator circuit as set forth in claim 40, wherein said transformer is a leakage reactance transformer, DC input terminals, and an inverter connected between said DC input terminals and said transformer primary winding to supply an alternating input voltage thereto.

43. The regulator as set forth in claim 17, wherein said switch means includes thyristors.

44. The regulator as set forth in claim 17, wherein said switch means includes thyristors, and a flip-flop circuit connected in circuit to establish alternate energization of said thyristors.

* * * * *